United States Patent
Park et al.

(10) Patent No.: US 11,262,541 B2
(45) Date of Patent: Mar. 1, 2022

(54) OPTICAL IMAGING SYSTEM

(71) Applicant: SAMSUNG ELECTRO-MECHANICS CO., LTD., Suwon-si (KR)

(72) Inventors: Il Yong Park, Suwon-si (KR); In Do Seo, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 239 days.

(21) Appl. No.: 16/410,026

(22) Filed: May 13, 2019

(65) Prior Publication Data

US 2020/0158993 A1    May 21, 2020

(30) Foreign Application Priority Data

Nov. 21, 2018  (KR) .......................... 10-2018-0144384

(51) Int. Cl.
| | |
|---|---|
| *G02B 3/02* | (2006.01) |
| *G02B 21/02* | (2006.01) |
| *G02B 15/14* | (2006.01) |
| *G02B 13/04* | (2006.01) |
| *G02B 9/64* | (2006.01) |
| *G02B 13/00* | (2006.01) |

(52) U.S. Cl.
CPC .......... *G02B 13/0045* (2013.01); *G02B 9/64* (2013.01)

(58) Field of Classification Search
CPC .......... G02B 13/18; G02B 3/00; G02B 21/02; G02B 15/177; G02B 13/04; G02B 9/64

USPC ........ 359/708, 642, 657, 682, 750, 751, 755
See application file for complete search history.

(56) References Cited

U.S. PATENT DOCUMENTS

| 10,310,227 B2 | 6/2019 | Hsu et al. | |
|---|---|---|---|
| 2016/0124191 A1 | 5/2016 | Hashimoto | |
| 2016/0170180 A1* | 6/2016 | Son ..................... | G02B 13/0045 |
| | | | 359/708 |
| 2016/0282587 A1 | 9/2016 | Hashimoto | |
| 2018/0149837 A1 | 5/2018 | Jung | |
| 2018/0239115 A1 | 8/2018 | Hsu et al. | |

(Continued)

FOREIGN PATENT DOCUMENTS

| CN | 107367827 A | 11/2017 |
|---|---|---|
| CN | 107664817 A | 2/2018 |
| CN | 107664818 A | 2/2018 |

(Continued)

OTHER PUBLICATIONS

Chinese Office Action dated Apr. 1, 2021 issued in counterpart Chinese Patent Application No. 201910880613.1. (7 pages in English)(7 pages in Chinese).

(Continued)

*Primary Examiner* — Dawayne Pinkney
(74) *Attorney, Agent, or Firm* — NSIP Law

(57) ABSTRACT

An optical imaging system includes a first lens, a second lens, a third lens, a fourth lens having negative refractive power, a fifth lens having positive refractive power, a sixth lens having a convex image-side surface, and a seventh lens, disposed sequentially from an object side. The optical imaging system satisfies $-5.0<f2/f<-2.0$, where f is a focal length of the optical imaging system and f2 is a focal length of the second lens. An F No. of the optical imaging system is less than 1.7.

15 Claims, 6 Drawing Sheets

(56) References Cited

U.S. PATENT DOCUMENTS

2019/0121088 A1* 4/2019 Shi .................... G02B 13/0045
2019/0278063 A1* 9/2019 Sekine ............... G02B 13/0045

FOREIGN PATENT DOCUMENTS

| CN | 207164343 U | 3/2018 |
| CN | 108459392 A | 8/2018 |

OTHER PUBLICATIONS

Chinese Office Action dated Sep. 16, 2021 in counterpart Chinese Patent Application No. 201910880613.1 (13 pages in English and 12 pages in Chinese).

* cited by examiner

OPTICAL IMAGING SYSTEM

CROSS-REFERENCE TO RELATED APPLICATIONS APPLICATION

This application claims the benefit under 35 USC 119(a) of Korean Patent Application No. 10-2018-0144384 filed on Nov. 21, 2018, in the Korean Intellectual Property Office, the entire disclosure of which is incorporated herein by reference for all purposes.

BACKGROUND

1. Field

The following description relates to an optical imaging system including seven lenses.

2. Description of Background

A compact camera is mounted on a wireless terminal. For example, compact cameras may be mounted on the front and back sides of the wireless terminal, respectively. Since such a compact camera is used for a variety of purposes such as outdoor scenery photographs and indoor portrait photographs, and performance not inferior to that of an ordinary camera is required therein. However, it may be difficult to realize high performance therein, because a compact camera may be limited by mounting space due to a size of a wireless terminal. Therefore, it is necessary to develop an optical imaging system capable of improving the performance of a compact camera without increasing the size of the compact camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having positive refractive power, a second lens, a third lens having a convex object-side surface, a fourth lens having negative refractive power, a fifth lens, a sixth lens having a convex image-side surface, and a seventh lens, disposed sequentially from an object side of the optical imaging system. The optical imaging system satisfies $-5.0 < f2/f < -2.0$, where f is a focal length of the optical imaging system, and f2 is a focal length of the second lens.

An F No. of the optical imaging system may be less than 1.7.

The optical imaging system may satisfy $0 < f1/f < 2.0$, where f1 is a focal length of the first lens.

The optical imaging system may satisfy $1.5 < f3/f$, where f3 is a focal length of the third lens.

The optical imaging system may satisfy $3.0 < |f4/f|$, where f4 is a focal length of the fourth lens.

The optical imaging system may satisfy $f5/f < 1.0$, where f5 is a focal length of the fifth lens.

The optical imaging system may satisfy $-0.4 < f1/f2$, where f1 is a focal length of the first lens.

The optical imaging system may satisfy $-2.0 < f2/f3 < 0$, where f3 is a focal length of the third lens.

An object-side surface of the sixth lens may be concave.

An object-side surface of the seventh lens may be concave.

In another general aspect, an optical imaging system includes a first lens, a second lens, a third lens, a fourth lens having negative refractive power, a fifth lens having positive refractive power, a sixth lens having a convex image-side surface, and a seventh lens, disposed sequentially from an object side, and an F No. is less than 1.7.

An image-side surface of the first lens may be concave.

An object-side surface of the second lens may be convex.

An image-side surface of the third lens may be concave.

An object-side surface of the fourth lens may be convex.

The optical imaging system may satisfy $-5.0 < f2/f < -2.0$, where f is a focal length of the optical imaging system, and f2 is a focal length of the second lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
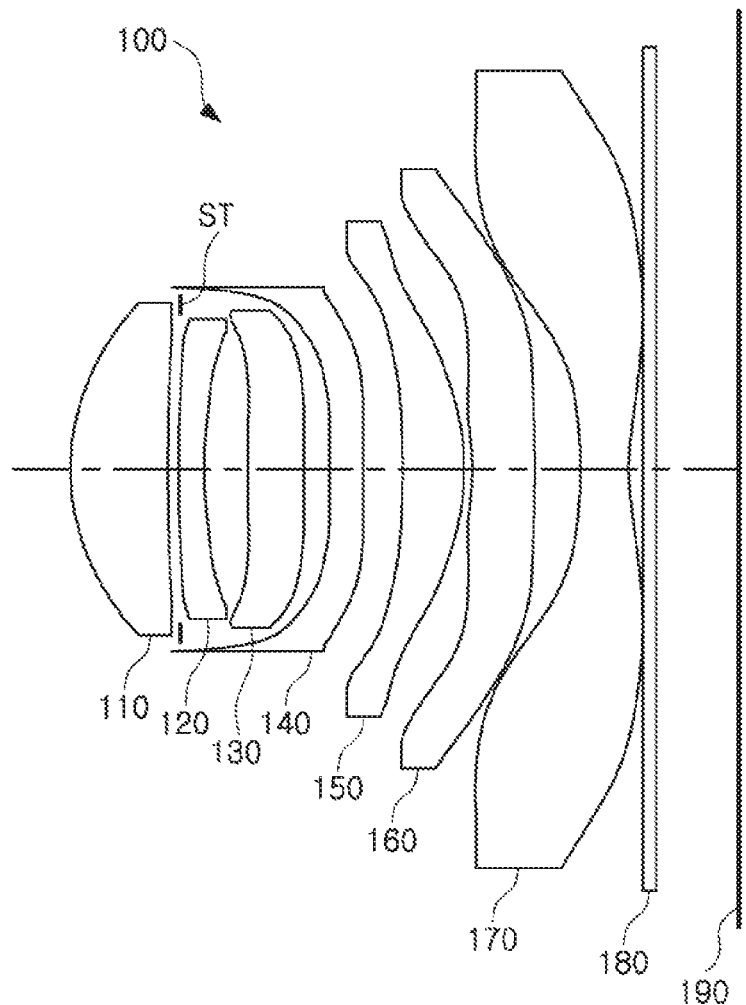
FIG. 1 is a view illustrating an optical imaging system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

Herein, a first lens refers to a lens closest to the object (or the subject), while the seventh lens refers to a lens closest to an image surface (or an image sensor). Herein, all numerical values of radii of curvature and thicknesses, of lenses, a distance from the object-side surface to the image surface of the first lens, that is, OAL, ½ of a diagonal length of the image surface, focal lengths, that is, IMG_HT, focal lengths, and the like, are indicated by millimeters (mm).

The thickness of the lens, the distance between the lenses, and OAL are a distance from the optical axis of the lens. In a description for a shape of each of the lenses, the meaning that one surface of a lens is convex is that a paraxial region of a corresponding surface is convex, and the meaning that one surface of a lens is concave is that a paraxial region of a corresponding surface is concave. Thus, even when it is described that one surface of a lens is convex, an edge portion of the lens may be concave. In a similar manner, even when it is described that one surface of a lens is concave, an edge portion of the lens may be convex.

The optical imaging system includes seven lenses. For example, the optical imaging system may include a first lens, a second lens, a third lens, a fourth lens, a fifth lens, a sixth lens, and a seventh lens, disposed sequentially from an object side. The first lens to the seventh lens are arranged at predetermined intervals. For example, each lens is not in contact with an image-side surface and an object-side surface of a neighboring lens in a paraxial region.

A first lens has refractive power. For example, the first lens has positive refractive power. One surface of the first lens is concave. For example, an image-side surface of the first lens is concave.

The first lens includes an aspherical surface. For example, both surfaces of the first lens may be aspherical surfaces. The first lens is formed using a material having high light transmittance and excellent workability. For example, the first lens may be formed using a plastic material. The first lens has a low refractive index. For example, the refractive index of the first lens may be less than 1.6.

A second lens has refractive power. For example, the second lens may have certain refractive power in a paraxial area. One surface of the second lens is convex. For example, an object-side surface of the second lens may be convex.

The second lens includes an aspherical surface. For example, an object-side surface of the second lens may be an aspherical surface. The second lens is formed using a material having high light transmittance and excellent workability. For example, the second lens may be formed using a plastic material. The second lens has a refractive index higher than that of the first lens. In one example, the refractive index of the second lens may be 1.64 or more. In another example, the refractive index of the second lens may be 1.67 or more.

A third lens has refractive power. One surface of the third lens is convex. For example, an object-side surface of the third lens may be convex.

The third lens includes an aspherical surface. For example, an image-side surface of the third lens may be an aspherical surface. The third lens is formed using a material having high light transmittance and excellent workability. For example, the third lens may be formed using a plastic material. The third lens has a refractive index substantially similar to that of the first lens. For example, the refractive index of the third lens may be less than 1.6.

A fourth lens has refractive power. For example, the fourth lens may have negative refractive power. One surface of the fourth lens is convex. For example, an object-side surface of the fourth lens may be convex.

The fourth lens includes an aspherical surface. For example, both surfaces of the fourth lens may be aspherical surfaces. The fourth lens is formed using a material having high light transmittance and excellent workability. For example, the fourth lens may be formed using a plastic material. The fourth lens has a refractive index higher than that of the first lens. For example, the refractive index of the fourth lens may be 1.6 or more.

A fifth lens has refractive power. For example, the fifth lens may have positive refractive power. One surface of the fifth lens is convex. For example, an image-side surface of the fifth lens may be convex. The fifth lens has a shape having an inflection point. For example, an inflection point may be formed in at least one surface of an object-side surface and an image-side surface of the fifth lens.

The fifth lens includes an aspherical surface. For example, both surfaces of the fifth lens may be aspherical surfaces. The fifth lens is formed using a material having high light transmittance and excellent workability. For example, the fifth lens may be formed using a plastic material. The fifth lens has a refractive index substantially similar to that of the first lens. For example, a refractive index of the fifth lens may be less than 1.6.

A sixth lens has refractive power. One surface of the sixth lens is convex. For example, an image-side surface of the sixth lens may be convex. The sixth lens has a shape having an inflection point. For example, an inflection point may be formed in at least one surface of an object-side surface and an image-side surface of the sixth lens.

A sixth lens includes an aspherical surface. For example, both surfaces of the sixth lens may be aspherical surfaces. The sixth lens is formed using a material having high light transmittance and excellent workability. For example, the sixth lens may be formed using a plastic material. The sixth lens has a refractive index substantially similar to that of the fifth lens. For example, a refractive index of the sixth lens may be less than 1.6.

A seventh lens has refractive power. One surface of the seventh lens is concave. For example, an object-side surface of the seventh lens may be concave. The seventh lens has a shape having an inflection point. For example, one or more inflection points may be formed in at least one surface of an object-side surface and an image-side surface of the seventh lens.

The seventh lens includes an aspherical surface. For example, both surfaces of the seventh lens may be aspherical surfaces. The seventh lens is formed using a material having high light transmittance and excellent workability. For example, the seventh lens may be formed using a plastic material. The seventh lens has a refractive index substantially similar to that of the sixth lens. For example, the refractive index of the seventh lens may be less than 1.6.

The first lens to the seventh lens include aspherical surfaces as described above. The aspherical surfaces of the first lens to the seventh lens may be expressed by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ Equation 1

In Equation 1, c is an inverse of a radius of curvature of the corresponding lens, K is a conic constant, r is a distance from a certain point on an aspherical surface of the lens to an optical axis in a direction perpendicular to the optical axis, A to J are aspherical constants, and Z (or SAG) is a distance between the certain point on the aspherical surface of the lens at the distance r and a tangential plane meeting the apex of the aspherical surface of the lens in the optical axis direction.

The optical imaging system further includes a filter, an image sensor, and a stop.

The filter is disposed between the seventh lens and the image sensor. The filter blocks light having some wavelengths. For example, the filter may block light having an infrared wavelength. The image sensor forms an image surface. For example, a surface of the image sensor may form the image surface. The stop is disposed to adjust an amount of light incident on the lens. For example, the stop may be disposed between the first lens and the second lens.

The optical imaging system may satisfy one or more of the following Conditional Expressions:

| | |
|---|---|
| $F\,No.<1.7$ | Conditional Expression 1 |
| $0<f1/f<2.0$ | Conditional Expression 2 |
| $-5.0<f2/f<-2.0$ | Conditional Expression 3 |
| $1.5<f3/f$ | Conditional Expression 4 |
| $3.0<|f4/f|$ | Conditional Expression 5 |
| $f5/f<1.0$ | Conditional Expression 6 |
| $-0.4<f1/f2$ | Conditional Expression 7 |
| $-2.0<f2/f3<0$ | Conditional Expression 8 |
| $25<V1-V2<45$ | Conditional Expression 9 |
| $V1-V3<25$ | Conditional Expression 10 |
| $0<V4-V2<10$ | Conditional Expression 11 |
| $-10<V1-V5<10$ | Conditional Expression 12 |
| $OAL/f<1.4$ | Conditional Expression 13 |
| $BFL/f<0.4$ | Conditional Expression 14 |
| $(IMG\_HT)/OAL<0.75$ | Conditional Expression 15 |
| $D12/f<0.1$ | Conditional Expression 16 |
| $1.5<D23/D34<2.0$ | Conditional Expression 17 |
| $0.5<D23/D67<1.2.$ | Conditional Expression 18 |

In the Conditional Expressions, f is a focal length of an optical imaging system, f1 is a focal length of a first lens, f2 is a focal length of a second lens, f3 is a focal length of a third lens, f4 is a focal length of a fourth lens, f5 is a focal length of a fifth lens, V1 is the Abbe number of the first lens, V2 is the Abbe number of the second lens, V3 is the Abbe number of the third lens, V4 is the Abbe number of the fourth lens, V5 is the Abbe number of the fifth lens, OAL is a distance from an object-side surface to an image surface of the first lens, BFL is a distance from an image-side surface to an image surface of a seventh lens, IMG_HT is ½ of a diagonal length of an image surface, D12 is a distance from the image-side surface of the first lens to the object-side surface of the second lens, D23 is a distance from the image-side surface of the second lens to the object-side surface of the third lens, D34 is a distance from the image-side surface of the third lens to the object-side surface of the fourth lens, and D67 is a distance from the image-side surface of the sixth lens to the object-side surface of the seventh lens.

Conditional Expressions 2 to 6 are conditions for defining the appropriate refractive power of the first lens to the fifth lens. Conditional Expressions 7 and 8 are conditions for defining a refractive power distribution ratio among the first lens to the third lens. Conditional Expressions 9 to 12 are numerical ranges for reducing chromatic aberration. Conditional Expression 14 is a condition for achieving miniaturization of the optical imaging system. Conditional Expression 16 is a condition for reducing longitudinal chromatic aberration.

Next, an optical imaging system according to various examples will be described.

First, referring to FIG. 1, an optical imaging system according to a first example will be described.

An optical imaging system 100 includes a first lens 110, a second lens 120, a third lens 130, a fourth lens 140, a fifth lens 150, a sixth lens 160, and a seventh lens 170.

The first lens 110 has positive refractive power, and an object-side surface is convex while an image-side surface is concave. The second lens 120 has negative refractive power, and an object-side surface is convex while an image-side surface is concave. The third lens 130 has positive refractive power, and an object-side surface is convex while an image-side surface is concave. The fourth lens 140 has negative refractive power, and an object-side surface is convex while an image-side surface is concave. The fifth lens 150 has positive refractive power, and an object-side surface is concave while an image-side surface is convex. In addition, an inflection point is formed in the image-side surface of the fifth lens 150. The sixth lens 160 has positive refractive power, and an object-side surface is concave while an image-side surface is convex. In addition, an inflection point is formed in the object-side surface and the image-side surface of the sixth lens 160. The seventh lens 170 has negative refractive power, and an object-side surface is concave while an image-side surface is concave. In addition, an inflection point is formed in the object-side surface and the image-side surface of the seventh lens 170.

The optical imaging system 100 further includes a filter 180, an image sensor 190, and a stop ST. The filter 180 is disposed between the seventh lens 170 and the image sensor 190, and the stop ST is disposed between the first lens 110 and the second lens 120.

Figure 2:
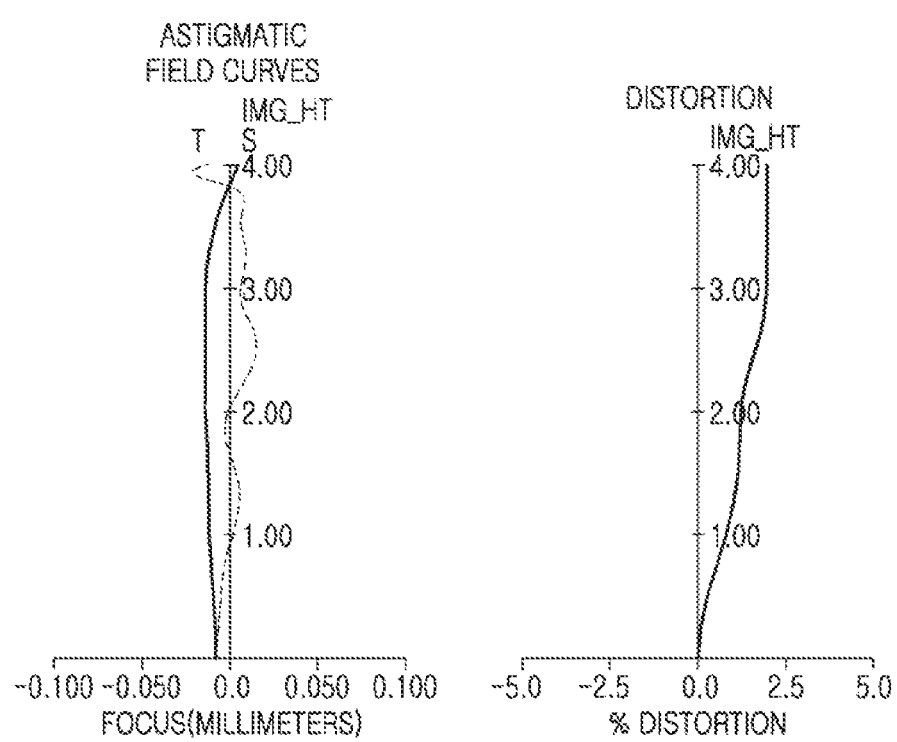
FIG. 2 is an aberration curve of the optical imaging system illustrated in FIG. 1.

The optical imaging system 100 represents aberration characteristics as illustrated in FIG. 2. Table 1 and Table 2 represent lens characteristics and aspheric values of an optical imaging system according to an example. In an optical imaging system according to an example, a focal length is 4.750, and a full field of view is 79.10 degrees.

TABLE 1

| Surface No. | Remark | Radius of Curvature | Thickness or Distance | Refractive Index | Abbe Number | Focal Length |
|---|---|---|---|---|---|---|
| 1 | | Infinity | 0 | | | |
| 2 | First | 2.0162 | 0.8550 | 1.545 | 56.10 | 4.399 |
| 3 | Lens | 10.6777 | 0.0985 | | | |
| 4 | Second | 7.8452 | 0.2300 | 1.678 | 19.20 | −12.163 |
| 5 | Lens | 3.9716 | 0.3878 | | | |
| 6 | Third | 23.9301 | 0.4937 | 1.545 | 56.10 | 48.748 |
| 7 | Lens | 235.6627 | 0.2218 | | | |
| 8 | Fourth | 19.6028 | 0.2950 | 1.667 | 20.40 | −39.617 |
| 9 | Lens | 11.1858 | 0.3527 | | | |
| 10 | Fifth | −8.0892 | 0.5458 | 1.545 | 56.10 | 4.590 |
| 11 | Lens | −1.9589 | 0.0300 | | | |
| 12 | Sixth | −121.1201 | 0.5907 | 1.545 | 56.10 | 17.914 |
| 13 | Lens | −9.0649 | 0.4014 | | | |
| 14 | Seventh | −4.4666 | 0.4300 | 1.545 | 56.10 | −2.829 |
| 15 | Lens | 2.4404 | 0.1276 | | | |
| 16 | Filter | Infinity | 0.1100 | 1.519 | 64.20 | |
| 17 | | Infinity | 0.7128 | | | |
| 18 | Imaging Plane | Infinity | 0.0000 | | | |

TABLE 2

| Surface No. | K | A | B | C | D | E | F | G | H | J |
|---|---|---|---|---|---|---|---|---|---|---|
| 2 | −0.82765 | 0.011347 | 0.009823 | −0.0137 | 0.014829 | −0.00895 | 0.00277 | −0.00032 | −3.4E−05 | 0 |
| 3 | −28.9884 | −0.04024 | 0.035692 | 0.022922 | −0.09447 | 0.107839 | −0.06454 | 0.020211 | −0.00261 | 0 |
| 4 | 2.051852 | −0.08995 | 0.107103 | −0.04344 | −0.04222 | 0.078781 | −0.05385 | 0.018487 | −0.00258 | 0 |
| 5 | −1.62878 | −0.05184 | 0.054827 | 0.045928 | −0.18087 | 0.230994 | −0.15137 | 0.050274 | −0.00615 | 0 |
| 6 | 0 | −0.04558 | 0.007406 | −0.05942 | 0.138064 | −0.20373 | 0.166104 | −0.07072 | 0.012499 | 0 |
| 7 | 0 | −0.07237 | −0.00049 | 0.063973 | −0.15828 | 0.185024 | −0.12747 | 0.047855 | −0.00741 | 0 |
| 8 | −7.50001 | −0.16338 | 0.019482 | 0.0891 | −0.20179 | 0.251654 | −0.18675 | 0.072234 | −0.01103 | 0 |
| 9 | −43.3425 | −0.13969 | 0.053322 | −0.04409 | 0.046303 | −0.02601 | 0.005008 | 0.000495 | −0.00017 | 0 |
| 10 | −35.8472 | −0.04914 | 0.079451 | −0.12508 | 0.104596 | −0.04839 | 0.012091 | −0.00149 | 6.93E−05 | 0 |
| 11 | −1.50001 | 0.04626 | −0.04661 | 0.025667 | −0.01096 | 0.004046 | −0.00093 | 0.000107 | −4.8E−06 | 0 |
| 12 | 7.571482 | 0.087201 | −0.13335 | 0.090564 | −0.03912 | 0.010086 | −0.00147 | 0.000112 | −3.5E−06 | 0 |
| 13 | 5.105203 | 0.089544 | −0.1134 | 0.059939 | −0.01987 | 0.004299 | −0.00058 | 4.26E−05 | −1.3E−06 | 0 |
| 14 | −2.67053 | −0.03831 | −0.05335 | 0.040182 | −0.01152 | 0.001781 | −0.00016 | 7.56E−06 | −1.5E−07 | 0 |
| 15 | −1.23141 | −0.12374 | 0.041768 | −0.01029 | 0.002055 | −0.00033 | 3.77E−05 | −2.8E−06 | 1.14E−07 | −2E−09 |

Figure 3:
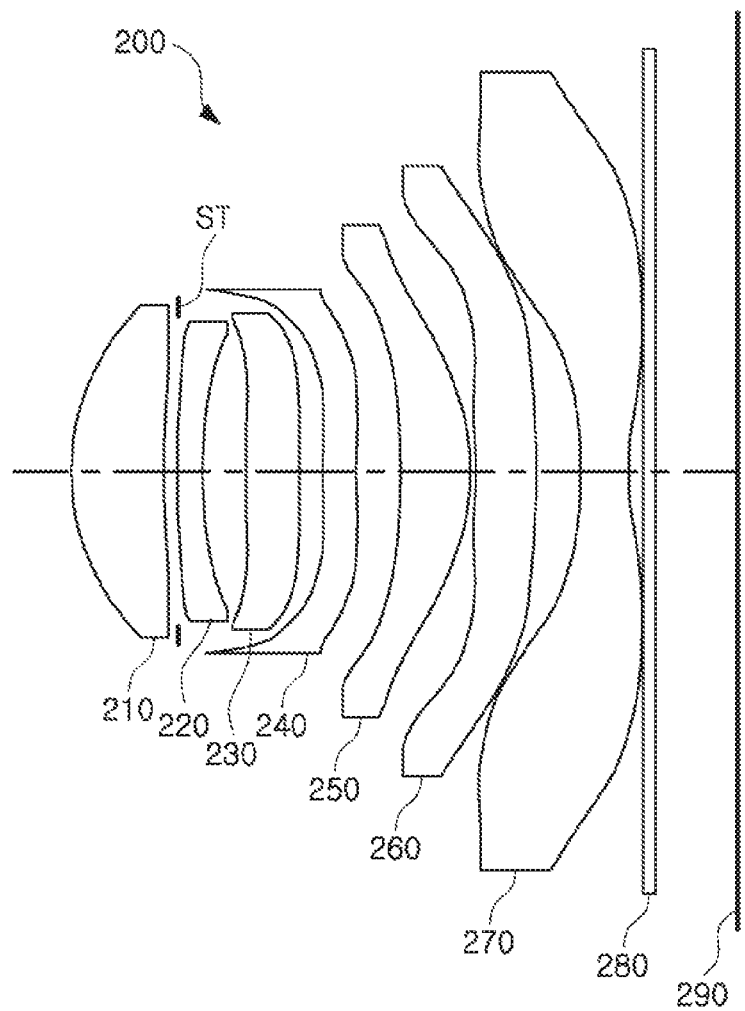
FIG. 3 is a view illustrating an optical imaging system according to an example.

Referring to FIG. 3, an optical imaging system according to a second example will be described.

An optical imaging system 200 includes a first lens 210, a second lens 220, a third lens 230, a fourth lens 240, a fifth lens 250, a sixth lens 260, and a seventh lens 270.

The first lens 210 has positive refractive power, and an object-side surface is convex while an image-side surface is concave. The second lens 220 has negative refractive power, and an object-side surface is convex while an image-side surface is concave. The third lens 230 has positive refractive power, and an object-side surface is convex while an image-side surface is concave. The fourth lens 240 has negative refractive power, and an object-side surface is convex while an image-side surface is concave. The fifth lens 250 has positive refractive power, and an object-side surface is concave while an image-side surface is convex. In addition, an inflection point is formed in the image-side surface of the fifth lens 250. The sixth lens 260 has positive refractive power, and an object-side surface is concave while an image-side surface is convex. In addition, an inflection point is formed in the object-side surface and the image-side surface of the sixth lens 260. The seventh lens 270 has negative refractive power, and an object-side surface is concave while an image-side surface is concave. In addition, an inflection point is formed in the object-side surface and the image-side surface of the seventh lens 270.

The optical imaging system 200 further includes a filter 280, an image sensor 290, and a stop ST. The filter 280 is disposed between the seventh lens 270 and the image sensor 290, and the stop ST is disposed between the first lens 210 and the second lens 220.

Figure 4:
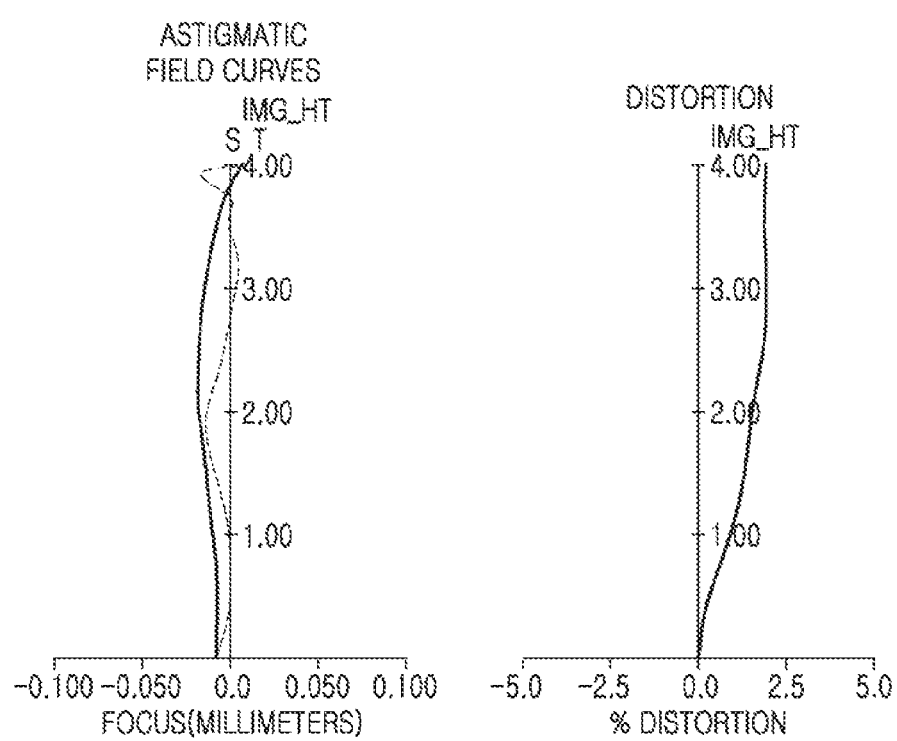
FIG. 4 is the aberration curve of the optical imaging system illustrated in FIG. 3.

The optical imaging system 200 represents aberration characteristics as illustrated in FIG. 4. Table 3 and Table 4 represent lens characteristics and aspheric values of an optical imaging system according to an example. In an optical imaging system according to an example, a focal length is 4.780, and a full field of view is 78.70 degrees.

Figure 5:
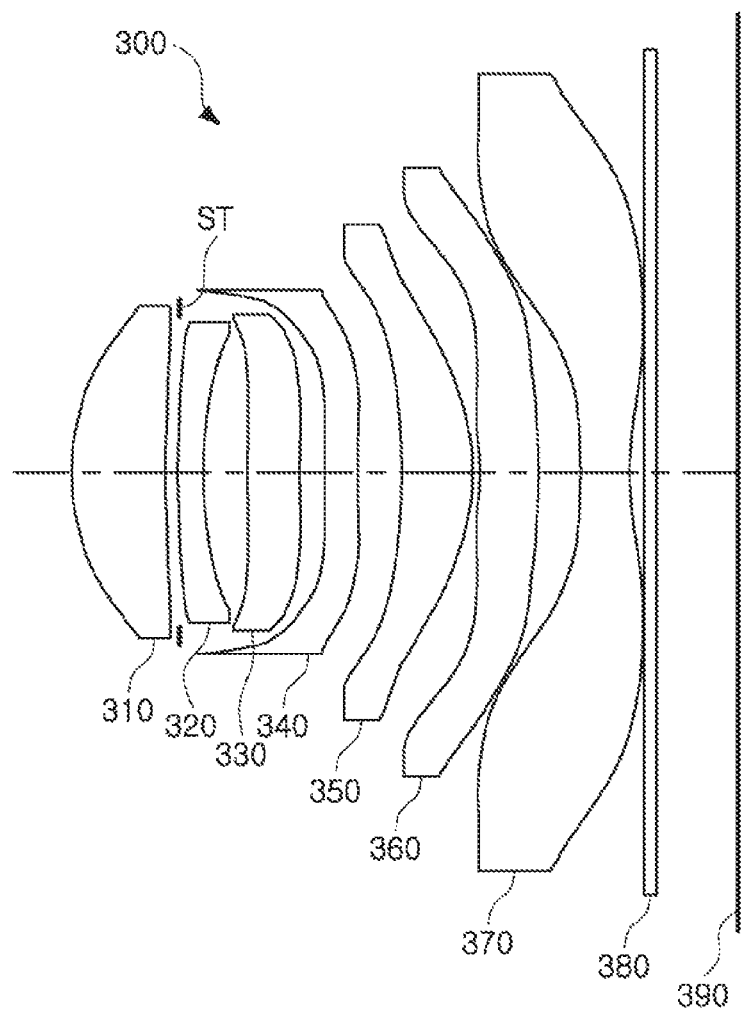
FIG. 5 is a view illustrating an optical imaging system according to an example.

Referring to FIG. 5, an optical imaging system according to a third example will be described.

An optical imaging system 300 includes a first lens 310, a second lens 320, a third lens 330, a fourth lens 340, a fifth lens 350, a sixth lens 360, and a seventh lens 370.

The first lens 310 has positive refractive power, and an object-side surface is convex while an image-side surface is concave. The second lens 320 has negative refractive power, and an object-side surface is convex while an image-side surface is concave. The third lens 330 has positive refractive power, and an object-side surface is convex while an image-side surface is concave. The fourth lens 340 has negative refractive power, and an object-side surface is convex while an image-side surface is concave. The fifth lens 350 has positive refractive power, and an object-side surface is concave while an image-side surface is convex. In addition, an inflection point is formed in the image-side surface of the fifth lens 350. The sixth lens 360 has positive refractive power, and an object-side surface is concave while an image-side surface is convex. In addition, an inflection point is formed in the object-side surface and the image-side surface of the sixth lens 360. The seventh lens 370 has negative refractive power, and an object-side surface is concave while an image-side surface is concave. In addition, an inflection point is formed in the object-side surface and the image-side surface of the seventh lens 370.

The optical imaging system 300 further includes a filter 380, an image sensor 390, and a stop ST. The filter 380 is disposed between the seventh lens 370 and the image sensor 390, and the stop ST is disposed between the first lens 310 and the second lens 320.

Figure 6:
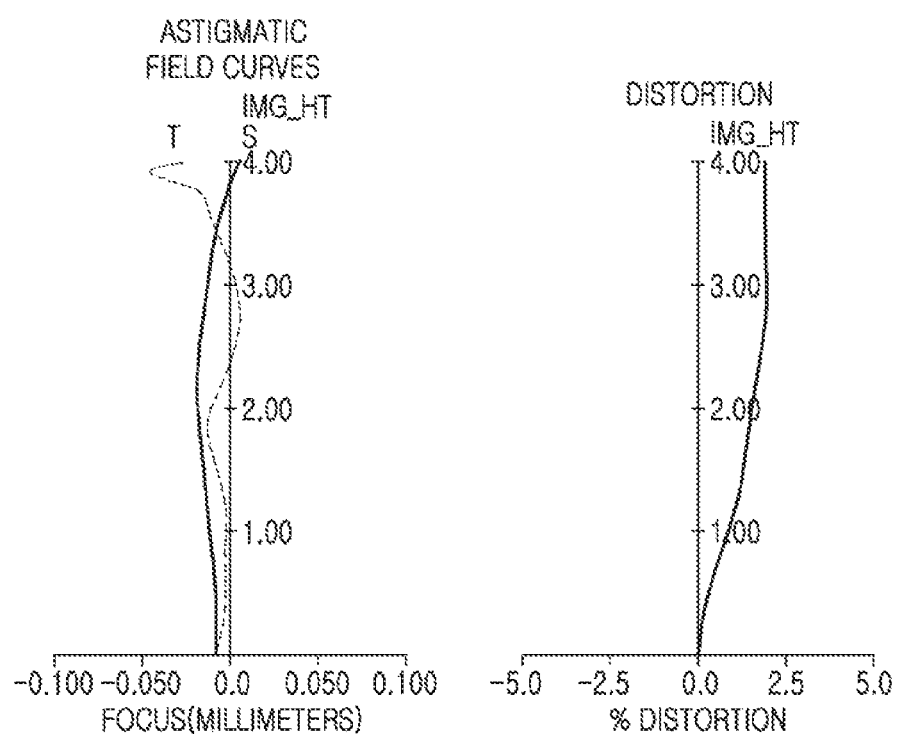
FIG. 6 is an aberration curve of the optical imaging system illustrated in FIG. 5.

The optical imaging system 300 represents aberration characteristics as illustrated in FIG. 6. Table 5 and Table 6 represent lens characteristics and aspheric values of an optical imaging system according to an example. In an optical imaging system according to an example, a focal length is 4.790, and a full field of view is 78.70 degrees.

TABLE 3

| Surface No. | Remark | Radius of Curvature | Thickness or Distance | Refractive Index | Abbe Number | Focal Length |
|---|---|---|---|---|---|---|
| 1 | | Infinity | 0.0000 | | | |
| 2 | First | 2.0038 | 0.8292 | 1.545 | 56.10 | 4.372 |
| 3 | Lens | 10.6672 | 0.1115 | | | |
| 4 | Second | 6.8828 | 0.2200 | 1.678 | 19.20 | −11.075 |
| 5 | Lens | 3.5437 | 0.3914 | | | |
| 6 | Third | 17.2405 | 0.4683 | 1.545 | 56.10 | 74.301 |
| 7 | Lens | 29.6974 | 0.2088 | | | |
| 8 | Fourth | 9.6988 | 0.2950 | 1.667 | 20.40 | −1449.605 |
| 9 | Lens | 9.4856 | 0.3915 | | | |
| 10 | Fifth | −6.8240 | 0.6130 | 1.545 | 56.10 | 4.515 |
| 11 | Lens | −1.8681 | 0.0300 | | | |
| 12 | Sixth | −50.4276 | 0.5112 | 1.545 | 56.10 | 30.723 |
| 13 | Lens | −12.6314 | 0.4309 | | | |
| 14 | Seventh | −4.9035 | 0.4300 | 1.545 | 56.10 | −2.946 |
| 15 | Lens | 2.4672 | 0.1292 | | | |
| 16 | Filter | Infinity | 0.1100 | 1.519 | 64.20 | |
| 17 | | Infinity | 0.7200 | | | |
| 18 | Imaging Plane | Infinity | 0.0000 | | | |

TABLE 5

| Surface No. | Remark | Radius of Curvature | Thickness or Distance | Refractive Index | Abbe Number | Focal Length |
|---|---|---|---|---|---|---|
| 1 | | Infinity | 0.0000 | | | |
| 2 | First | 1.9991 | 0.8363 | 1.545 | 56.10 | 4.336 |
| 3 | Lens | 10.9627 | 0.1001 | | | |
| 4 | Second | 6.8837 | 0.2300 | 1.678 | 19.20 | −10.703 |
| 5 | Lens | 3.4839 | 0.3909 | | | |
| 6 | Third | 15.1151 | 0.4613 | 1.545 | 56.10 | 69.699 |

TABLE 4

| Surface No. | K | A | B | C | D | E | F | G | H | J |
|---|---|---|---|---|---|---|---|---|---|---|
| 2 | −0.81403 | 0.018458 | −0.01587 | 0.040524 | −0.05141 | 0.039216 | −0.01782 | 0.004452 | −0.0005 | 0 |
| 3 | −28.9884 | −0.02351 | −0.02064 | 0.124027 | −0.20592 | 0.182963 | −0.09391 | 0.026117 | −0.00306 | 0 |
| 4 | 1.796376 | −0.07504 | 0.01795 | 0.161118 | −0.31503 | 0.303122 | −0.16438 | 0.048212 | −0.00592 | 0 |
| 5 | −1.46222 | −0.04309 | −0.00873 | 0.218095 | −0.4317 | 0.454673 | −0.27134 | 0.086303 | −0.0109 | 0 |
| 6 | 0 | −0.052 | 0.06265 | −0.19937 | 0.355711 | −0.40542 | 0.2758 | −0.10205 | 0.01585 | 0 |
| 7 | 0 | −0.08525 | 0.064392 | −0.08459 | 0.044685 | 0.006742 | −0.02712 | 0.015498 | −0.00299 | 0 |
| 8 | −7.50001 | −0.16399 | 0.084469 | −0.08276 | 0.015417 | 0.061135 | −0.07142 | 0.032225 | −0.00529 | 0 |
| 9 | −43.3425 | −0.1266 | 0.069772 | −0.07553 | 0.051084 | −0.01523 | −0.00117 | 0.001736 | −0.00026 | 0 |
| 10 | −35.8472 | −0.06738 | 0.092799 | −0.10368 | 0.066192 | −0.02429 | 0.004609 | −0.00033 | −2.2E−06 | 0 |
| 11 | −1.46337 | 0.028986 | −0.03645 | 0.033498 | −0.01976 | 0.00718 | −0.00146 | 0.000152 | −6.2E−06 | 0 |
| 12 | 7.571482 | 0.093447 | −0.13638 | 0.088737 | −0.03529 | 0.008254 | −0.00109 | 7.54E−05 | −2.1E−06 | 0 |
| 13 | 7.072576 | 0.109022 | −0.13757 | 0.074103 | −0.02415 | 0.004937 | −0.00061 | 4.13E−05 | −1.2E−06 | 0 |
| 14 | −2.95923 | −0.02983 | −0.04958 | 0.034186 | −0.00928 | 0.001372 | −0.00012 | 5.42E−06 | −1.1E−07 | 0 |
| 15 | −1.24296 | −0.11909 | 0.039373 | −0.00957 | 0.001829 | −0.00027 | 2.93E−05 | −2E−06 | 8.13E−08 | −1.4E−09 |

TABLE 5-continued

| Surface No. | Remark | Radius of Curvature | Thickness or Distance | Refractive Index | Abbe Number | Focal Length |
|---|---|---|---|---|---|---|
| 7 | Lens | 24.8060 | 0.2165 | | | |
| 8 | Fourth | 9.1601 | 0.2950 | 1.667 | 20.40 | −604.402 |
| 9 | Lens | 8.8412 | 0.3884 | | | |
| 10 | Fifth | −6.9582 | 0.6273 | 1.545 | 56.10 | 4.467 |
| 11 | Lens | −1.8634 | 0.0300 | | | |
| 12 | Sixth | −41.6051 | 0.4998 | 1.545 | 56.10 | 29.653 |
| 13 | Lens | −11.7035 | 0.4259 | | | |
| 14 | Seventh | −4.7546 | 0.4300 | 1.545 | 56.10 | −2.917 |
| 15 | Lens | 2.4711 | 0.1285 | | | |
| 16 | Filter | Infinity | 0.1100 | 1.519 | 64.20 | |
| 17 | | Infinity | 0.7200 | | | |
| 18 | Imaging Plane | Infinity | 0.0000 | | | |

TABLE 6

| Surface No. | K | A | B | C | D |
|---|---|---|---|---|---|
| 2 | −0.81836 | 0.015729 | −0.00532 | 0.018656 | −0.02468 |
| 3 | −28.9884 | −0.02404 | −0.03027 | 0.155672 | −0.25021 |
| 4 | 1.678827 | −0.07381 | 0.009881 | 0.186764 | −0.35309 |
| 5 | −1.39262 | −0.04675 | 0.02002 | 0.127662 | −0.26646 |
| 6 | 0 | −0.0507 | 0.049166 | −0.15051 | 0.265743 |
| 7 | 0 | −0.08653 | 0.064014 | −0.07542 | 0.026135 |
| 8 | −7.50001 | −0.16412 | 0.077765 | −0.06528 | −0.00986 |
| 9 | −43.3425 | −0.12502 | 0.067321 | −0.0756 | 0.056459 |
| 10 | −35.8472 | −0.06297 | 0.086646 | −0.09965 | 0.064742 |
| 11 | −1.45506 | 0.02825 | −0.03384 | 0.029606 | −0.0174 |
| 12 | 7.571482 | 0.091125 | −0.13317 | 0.086605 | −0.03456 |
| 13 | 4.188736 | 0.108091 | −0.13715 | 0.074145 | −0.0243 |
| 14 | −2.36142 | −0.02883 | −0.05072 | 0.035061 | −0.00958 |
| 15 | −1.17434 | −0.12024 | 0.040163 | −0.01001 | 0.001976 |

| Surface No. | E | F | G | H | J |
|---|---|---|---|---|---|
| 2 | 0.019304 | −0.00891 | 0.002251 | −0.00027 | 0 |
| 3 | 0.217045 | −0.10888 | 0.029625 | −0.00339 | 0 |
| 4 | 0.333536 | −0.17807 | 0.051462 | −0.00624 | 0 |
| 5 | 0.270514 | −0.14939 | 0.042288 | −0.00424 | 0 |
| 6 | −0.30892 | 0.214921 | −0.08123 | 0.012893 | 0 |
| 7 | 0.02675 | −0.04013 | 0.02009 | −0.00364 | 0 |
| 8 | 0.087439 | −0.08991 | 0.03933 | −0.00638 | 0 |
| 9 | −0.02144 | 0.001843 | 0.001055 | −0.00002 | 0 |
| 10 | −0.0239 | 0.00449 | −0.00031 | −4.7E−06 | 0 |
| 11 | 0.006457 | −0.00134 | 0.000141 | −5.9E−06 | 0 |
| 12 | 0.008116 | −0.00108 | 7.46E−05 | −2.1E−06 | 0 |
| 13 | 0.005003 | −0.00062 | 4.27E−05 | −1.2E−06 | 0 |
| 14 | 0.001426 | −0.00012 | 5.69E−06 | −1.1E−07 | 0 |
| 15 | −0.00031 | 3.37E−05 | −2.4E−06 | 9.76E−08 | −1.7E−09 |

In Table 7, conditional expression values of an optical imaging system according to the first example, the second example, and the third example are illustrated.

TABLE 7

| Remark | Conditional Expression | First Example | Second Example | Third Example |
|---|---|---|---|---|
| 1 | F No | 1.6500 | 1.6500 | 1.6500 |
| 2 | f1/f | 0.9262 | 0.9146 | 0.9051 |
| 3 | f2/f | −2.5606 | −2.3169 | −2.2345 |
| 4 | f3/f | 10.2626 | 15.5442 | 14.5510 |
| 5 | |f4/f| | 8.3405 | 303.2647 | 126.1800 |
| 6 | f5/f | 0.9664 | 0.9445 | 0.9326 |
| 7 | f1/f2 | −0.3617 | −0.3947 | −0.4051 |
| 8 | f2/f3 | −0.2495 | −0.1491 | −0.1536 |
| 9 | V1−V2 | 36.9000 | 36.9000 | 36.9000 |
| 10 | V1−V3 | 0.0000 | 0.0000 | 0.0000 |
| 11 | V4−V2 | 1.2000 | 1.2000 | 1.2000 |
| 12 | V1−V5 | 0.0000 | 0.0000 | 0.0000 |
| 13 | OAL/f | 1.2385 | 1.2322 | 1.2296 |
| 14 | BFL/f | 0.2001 | 0.2007 | 0.2001 |
| 15 | (IMG_HT)/OAL | 0.6799 | 0.6791 | 0.6791 |
| 16 | D12/f | 0.0207 | 0.0233 | 0.0209 |
| 17 | D23/D34 | 1.7481 | 1.8744 | 1.8056 |
| 18 | D23/D67 | 0.9661 | 0.9083 | 0.9178 |

The optical imaging system according to the examples may have the following optical characteristics in general. For example, a total length OAL of the optical imaging system is determined to be within a range of 5.0 mm to 6.2 mm, a focal length is determined to be within a range of 4.5 mm to 5.0 mm, a focal length of a first lens is determined to be within a range of 3.0 mm to 6.0 mm, a focal length of a second lens is determined to be within a range of −15 mm to −10 mm, a focal length of a third lens is determined to be within a range of 30 mm to 80 mm, a focal length of a fourth lens is determined to be smaller than −30 mm, a focal length of a fifth lens is determined to be within a range of 3.0 mm to 6.0 mm, a focal length of a sixth lens is determined to be within a range of 15.0 mm to 40.0 mm, and a focal length of a seventh lens is determined to be within a range of −5.0 mm to −1.0 mm.

As set forth above, according to the various examples, the performance of a compact camera may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power;
   a second lens a convex object-side surface in a paraxial region thereof;
   a third lens having a convex object-side surface in a paraxial region thereof;
   a fourth lens having a negative refractive power;
   a fifth lens;
   a sixth lens having a concave object-side surface in a paraxial region thereof, and a convex image-side surface in a paraxial region thereof; and
   a seventh lens,
   wherein the first to seventh lenses are sequentially disposed in ascending numerical order from an object side of the optical imaging system toward an imaging plane of the optical imaging system, and
   $-5.0 < f2/f < -2.0$, where f is a focal length of the optical imaging system, and f2 is a focal length of the second lens.

2. The optical imaging system of claim 1, wherein an F No. of the optical imaging system is less than 1.7.

3. The optical imaging system of claim 1, wherein $0 < f1/f < 2.0$, where f1 is a focal length of the first lens.

4. The optical imaging system of claim 1, wherein $1.5 < f3/f$, where f3 is a focal length of the third lens.

5. The optical imaging system of claim 1, wherein $3.0 < |f4/f|$, where f4 is a focal length of the fourth lens.

6. The optical imaging system of claim 1, wherein $f5/f < 1.0$, where f5 is a focal length of the fifth lens.

7. The optical imaging system of claim 1, wherein $-0.4 < f1/f2$, where f1 is a focal length of the first lens.

8. The optical imaging system of claim 1, wherein $-2.0 < f2/f3 < 0$, where f3 is a focal length of the third lens.

9. The optical imaging system of claim 1, wherein an object-side surface of the seventh lens is concave in a paraxial region thereof.

10. An optical imaging system comprising:
    a first lens;
    a second lens;
    a third lens;
    a fourth lens having a negative refractive power;
    a fifth lens having a positive refractive power;
    a sixth lens having a concave object-side surface in a paraxial region thereof, and a convex image-side surface in a paraxial region thereof; and
    a seventh lens;
    wherein the first to seventh lenses are sequentially disposed in ascending numerical order from an object side of the optical imaging system toward an imaging plane of the optical imaging system, and
    an F No. of the optical imaging system is less than 1.7.

11. The optical imaging system of claim 10, wherein an image-side surface of the first lens is concave in a paraxial region thereof.

12. The optical imaging system of claim 10, wherein an object-side surface of the second lens is convex in a paraxial region thereof.

13. The optical imaging system of claim 10, wherein an image-side surface of the third lens is concave in a paraxial region thereof.

14. The optical imaging system of claim 10, wherein an object-side surface of the fourth lens is convex in a paraxial region thereof.

15. The optical imaging system of claim 10, wherein $-5.0 < f2/f < -2.0$, where f is a focal length of the optical imaging system, and f2 is a focal length of the second lens.

* * * * *